Patented Sept. 13, 1932

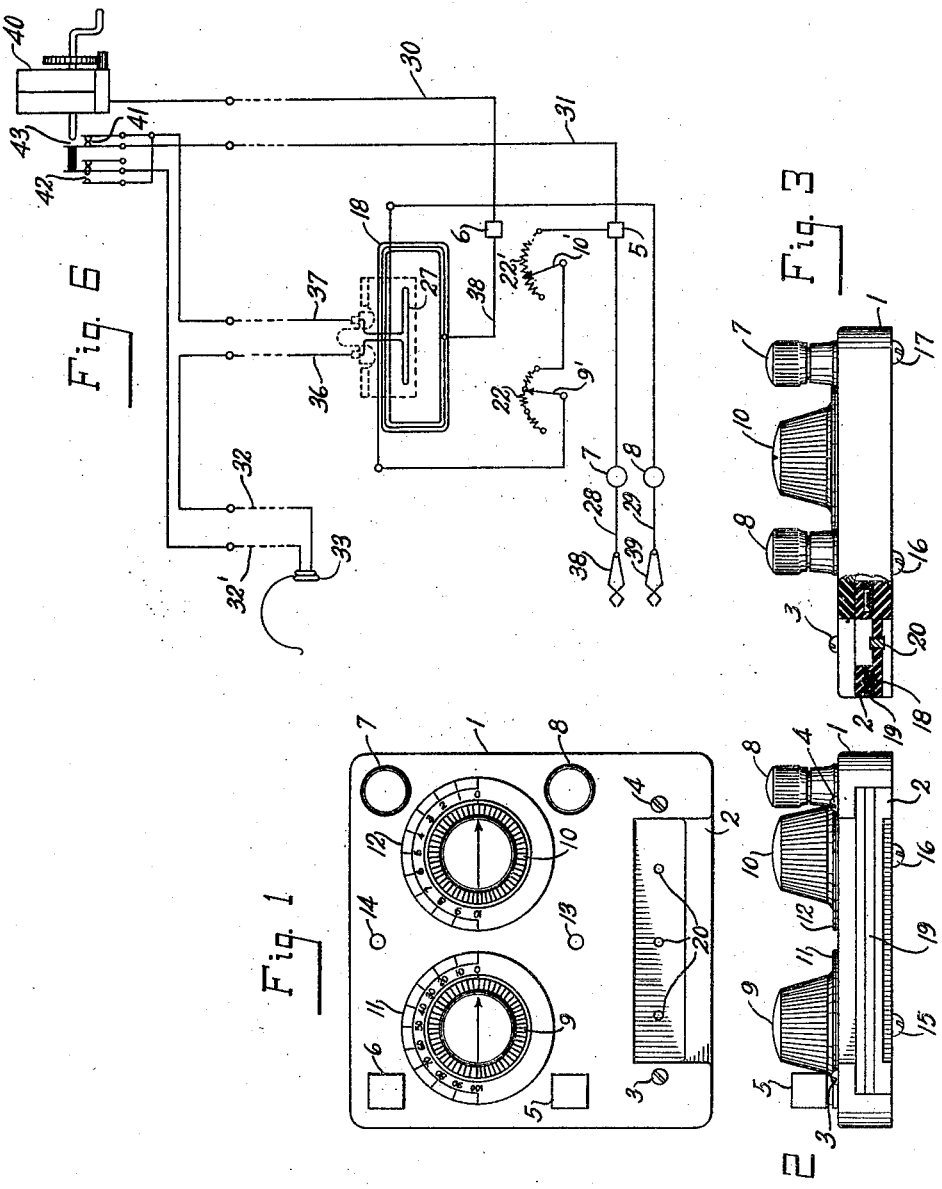

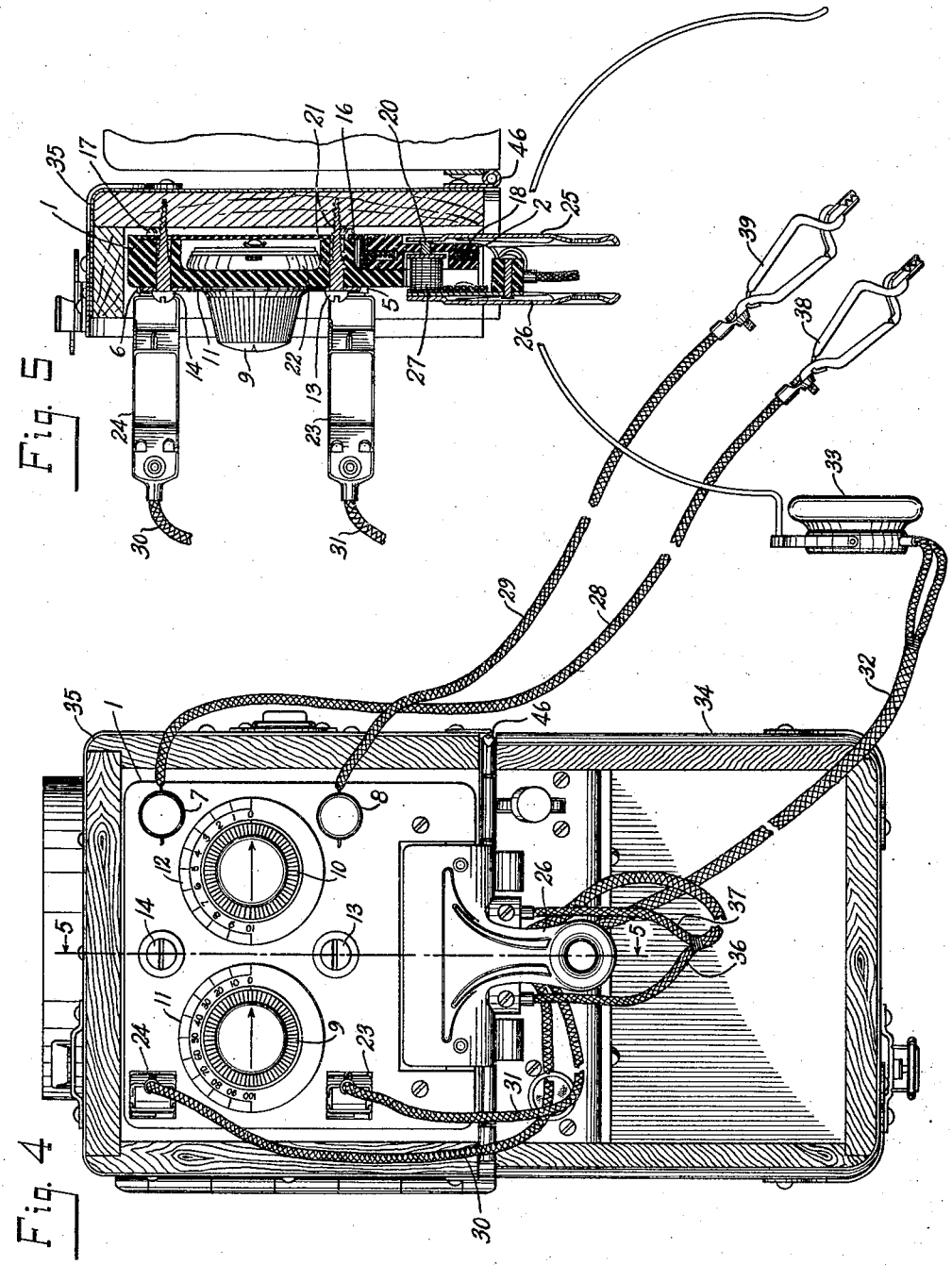

1,877,216

UNITED STATES PATENT OFFICE

CLARENCE A. ANDERSON, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

RESISTANCE MEASURING APPARATUS

Application filed November 1, 1929. Serial No. 404,145.

This invention relates to apparatus for measuring electrical resistance by the so-called "inductive balancing method"; particularly to resistance measuring apparatus of an auxiliary character for use in connection with a lineman's portable test set. Apparatus of this type is described in applicant's Patent No. 1,859,860, granted May 24, 1932, on which the instant invention may be considered as an improvement.

Portable test sets for detecting faults by means of an alternating or pulsating current and an exploring or finder coil are more or less generally used for the maintenance of communication or other wire systems. A test set of this type is described in applicant's Patent No. 1,778,207, granted October 14, 1929. This invention is particularly adapted to operate with a test set of the above type and to utilize the magneto or generator, finder coil, and other apparatus with which the test set is usually provided.

The ordinary portable test set is very useful for applying numerous tests to telephone or other line, but it is not adapted to accurately measure resistance. Such measurements are often necessary for the detection or location of a fault in transmission lines, and in the past have been made by separate test sets of the Wheatstone bridge or inductive balance type. The weight of the additional apparatus and the complications involved in connecting it up for testing purposes makes the arrangement rather inefficient and impractical for general use by the average maintenance force. It is one of the main objects of this invention to produce a simple, practical, and accurate resistance measuring device which may readily be incorporated in the ordinary lineman's portable test set without increasing the size of the set or adding materially to its weight. This object is achieved by improved design and construction of the auxiliary device which permits it to be mounted within the test set in space which is now available but unused. Further the auxiliary device may be installed without altering the circuit of the set, it being only necessary to attach the device by means of two screws to the case in which the test set is carried. The device may be put in operation by merely connecting up the two line clips and the finder coil of the portable set to the binding posts and inductive balance coil of the device. It may also be noted that the inductive balance coil of the device is wound on a spool which is so shaped that the finder coil will always be connected up in the proper manner.

Another object of the invention is the improvement of the inductive balance coil to render it more sensitive in measuring very low resistances and at the same time to make the adjustment of the apparatus less critical. Other objects and features not specifically mentioned will be made apparent in the following description of the apparatus and its use.

Referring to the accompanying drawings comprising Figs. 1 to 6 inclusive. Fig. 1 is a top view of the auxiliary device. Fig. 2 is a front view of the same, and Fig. 3 is a side view with a portion of the base cut away to show the construction of the coil spool. Fig. 4 shows the auxiliary set mounted in the cover of an ordinary lineman's portable test set with the finder coil and spring clips in place. Fig. 5 is a cross section of the auxiliary device, finder coil and cover of the portable set taken along the line 5—5 of Fig. 4. Fig. 6 shows diagrammatically the circuit of the auxiliary set and the cooperating elements of the portable set in operative relationship.

The auxiliary set consists essentially of a double wound inductive coil, variable resistances, a base on which the various parts are assembled, binding posts and suitable connections between the different elements. The construction of the set may be clearly seen by referring to Figs. 1, 2, 3, and 5 in which corresponding parts are similarly designated. The base 1 is composed of hard rubber or a phenolic insulating material moulded or machined to the required shape, and of such dimension that it fits into the cover of an ordinary portable test set of the type previously referred to. The underside of the base is recessed as shown in Fig. 5 to provide space for the resistance elements such as 22 and the connecting wires. The resistance elements and wires are protected from dust and moisture by a cover 21 of insulating material which is fastened to the base by means of screws 15—17.

One side of the base, which may be considered as the front, has a recessed slot into which a coil spool is accurately fitted and held in place by screws 3 and 4. The spool 2 of which a cross section is shown in the cut away portion of Fig. 3 is a rectangular piece of insulating material with a depression in the upper side into which the inductance coil 27 of a finder coil is set. A slot is cut around the outside edge of the spool in which the wires 18 of an inductive coil are wound. The number of these wires, that is the number of turns in the winding of the coil, will depend upon the sensitivity required; an increase in the number of turns resulting in an increase in the sensitivity of the device. The lower surface of the spool is cut away to provide a space into which the lower jaw of the finder coil will fit readily. A number of soft iron rivets 20 extend through the insulating material in the center of the coil spool and serve to complete the magnetic circuit of the finder coil when the same is in engagement with the auxiliary device. The coil spool is so-shaped that the finer coil can be connected up only in the proper manner.

Two resistance elements 22 and 22' are mounted in the recessed space in the underside of the base. The removable contact arms or brushes 9', and 10' which wipe over the respective elements are mounted on shafts extending through the base and terminating in knobs 9 and 10 by which the brushes may be adjusted. The stationary dials 11 and 12 are permanently mounted on the base concentrically with the adjusting knobs, and are marked with the proper resistance values to indicate the setting of the contact arms. The total resistance of the elements 22 and 22' may be varied according to the type of work for which the auxiliary device is to be used, that is, on the range of resistance which it is desired to measure. One element will have a resistance value equal to the highest resistance to be measured. For an ultimate capacity of approximately one hundred ohms a continuously variable resistance may be used. For higher ultimate capacity, a resistance of the "built up" type, variable in steps of ten, twenty or one hundred ohms is more satisfactory, as it may be more substantially constructed. This element will be used for approximate adjustment. The other element which will provide the fine adjustment will be continuously variable and of relatively low resistance. In case the rough adjustment resistance is of the continuously variable type the fine adjustment element may be of any value from one to ten ohms depending on the accuracy required, the lower resistance providing the more accurate measurement. In case the "built up" type of resistance is used for approximate adjustment, the value of the fine adjustment element will correspond to the steps or resistance value of each individual section of that resistance.

The binding posts which are of two types are firmly fixed to the base. The posts for incoming leads are square and are provided with a slot so that the spring clips of the portable set may be firmly attached. The posts for outgoing leads are of the screw type for holding plain wires or the well known spade type terminal clips. The leads 28 and 29 normally provided for use with these posts are equipped with spring clips 38 and 39 for making connection with lines under test.

Referring to Fig. 4 and 5, the method of mounting the auxiliary device in a portable test set is clearly shown. The two screws 13 and 14 hold the auxiliary device firmly to the cover 35 which swings back on a hinge 46 to make this set readily accessible. Spring clips 23 and 24 and exploring coil 26, of course, are connected up as shown only when it is desired to use the auxiliary device.

Having described the construction of the auxiliary device, the circuit and its operation will now be considered. Referring to Fig. 6 magneto 40 when operated opens contacts 41 and closes contacts 42 and at contacts 43 connects up lead 31. By the closure of contact 42, receiver 33 is connected in series with the finder coil 27 by way of conductors 32, 32', 36, and 37. A circuit now extends from the stator of the magneto, conductor 30, binding post 6, conductor 38, thence in two parallel paths of equal resistance comprising the two opposing windings of the inductive coil 18, one path extending by way of brush 9', resistance 22, brush 10', resistance 22', binding post 5, conductor 31, and contacts 43 to the rotor of the magneto; the other path extends by way of binding post 8 and conductor 29 to spring clip 39. Spring clip 38 is connected to the rotor of the magneto by way of conductor 28, binding post 7, binding post 5, and the previously traced circuit.

The finder coil having been clamped in place on the coil spool of the auxiliary device, there is an inductive connection between that coil and the inductive balance coil of the device. Coil 27 of the finder coil is wound on a core which is attached to the upper jaw of a clamp. The coil and its core now extend through the center of the inductive balance coil of the device, and consequently, current flow in the balance coil will induce a similar current in the winding of the coil 27 which current will be audible in receiver 33. The rivets 20 complete the magnetic circuit between the core of the finder coil and the lower jaw of the spring clamp, this magnetic circuit being closed through the hinge of the spring clamp and the upper jaw. The purpose of this closed circuit is to render the finder coil more sensitive.

As an example, the method of measuring resistance of a joint connecting two conductors will be described. Spring clips 38 and 39 are connected respectively to the conductors on opposite sides of the joint. The magneto is then operated, alternating current flowing over the two previously traced paths, one including the variable resistances, the other the unknown resistance, and through the opposing windings of the inductive coil. If the current in both circuits is equal the inductive effect will be zero and no current will be induced in the finder coil. If the currents in the two circuits are not equal, the unbalanced condition will cause a current to be induced in the finder coil which will be audible in the receiver. The variable resistances may then be adjusted until no tone is audible and the value of the unknown resistance can be read directly from the setting knobs 9 and 10 with respect to the dials 11 and 12.

In making measurements of this kind it is often desirable to reduce the potential of the test current to prevent breaking down the resistance in the joint. This is readily accomplished by inserting a small step-down transformer between the magneto and the auxiliary set. Such transformers are well known and easily obtainable and it is not considered necessary to describe one here. An alternative method of reducing the voltage is to connect a shunt resistance across binding posts 5 and 6.

To measure the resistance of a grounded conductor, spring clip 38 is connected to a test ground and spring clip 39 is connected to the conductor to be tested. The magneto is then operated and the variable resistances adjusted as in the previous instance. The resistance of a loop may be measured by connecting spring clips 38 and 39 to the two sides of the loop and operating the magneto as in the previous instance. Tests of this kind may be made on telephone lines to which ringers are bridged without disconnecting such bridges or without interference from the same. This is due to the peculiar character of the tone used, the ringers of the telephones offering sufficient impedance to the test current to substantially prevent its passage.

The device is particularly adapted for measuring the resistance in central office or station ground. The usual method is to establish two test grounds and to measure the difference in resistance between the station ground and the respective test grounds and also the difference in resistance between the test grounds. The actual resistance of the station ground can then be calculated. The connections for these tests are similar to those used for measuring the resistance of a grounded conductor. The results obtained are more satisfactory than those obtained by the usual bridge test since in this case the inductive balance is not affected by foreign currents which may be present. In this case also the peculiar current used to test is very satisfactory as there is no possibility of confusing the tone with that of any stray alternating current which may be present.

The foregoing tests are examples of the uses to which the auxiliary device may be put. Many other tests will suggest themselves, in fact, practically any test involving the measurement of resistance may be made.

What is considered new and is desired to have protected by Letters Patent is set forth in the appended claims.

1. A coil spool of insulating material assembled integrally with the base of an auxiliary resistance measuring device for use with a lineman's test set, a depression in the upper side of the spool adapted to accommodate the upper jaw of the exploring coil of the test set, a slot in the lower side of the spool adapted to engage the lower jaw of the exploring coil, and a continuous slot around the perimeter of the spool for supporting the windings of the inductance coil of the device.

2. A testing device comprising a flat rectangular base, rheostats mounted on the base with the resistance elements in the under side thereof and the adjusting knobs on the upper side, and a coil spool assembled integrally with the base and adapted to be engaged with by a finder coil.

3. A testing device comprising a flat rectangular base of insulating material having a recessed space in the bottom and a slot in one of the sides, a coil spool adapted to fit into said slot, and variable resistances mounted on the base with the resistance elements in said recessed space and the adjusting knobs projecting above the upper surface of the base.

4. As an article of manufacture, an auxiliary resistance measuring device comprising a variable resistance and an inductive balance coil mounted on a flat rectangular base of insulating material adapted to fit into the case of a lineman's portable test set and adapted to be used in connection with such test set.

5. The combination with a portable type lineman's test set, of an auxiliary resistance measuring device comprising an inductive balance coil and a variable resistance integrally mounted on a base of insulating material, means for mechanically connecting said base with the test set, and means for electrically connecting the device with the test set.

6. The combination with a portable type lineman's test set including a carrying case, of an auxiliary resistance measuring device comprising an inductive balance coil and a variable resistance both mounted on a base adapted to be received in said case, and circuit connections for operatively connecting the device with the test set.

7. The combination with a portable type lineman's test set including a carrying case provided with a hinged cover, of an auxiliary resistance measuring device comprising an inductance coil and variable resistance mounted on a base adapted to fit in said cover, and circuit connections for operatively connecting the device with the test set.

8. The combination with a portable type lineman's test set enclosed in a case and including an exploring coil, of an auxiliary testing device including an inductance adapted to cooperate with the exploring coil and a variable resistance, said inductance and said resistance being mounted on a base adapted to fit into said case, and temporary electrical connections between the device and the test set.

9. The combination with a portable type lineman's test set enclosed in a multi-compartment case and including an exploring coil, of an auxiliary resistance measuring device comprising a base of insulating material with an integrally mounted inductive balance coil adapted to cooperate with the exploring coil, means for mounting the device in a compartment of said case, and means for electrically connecting the device and the test set.

10. The combination with a portable type lineman's test set including a generator enclosed in a carrying case, of a resistance measuring device comprising an inductive balance coil and a variable resistance both mounted on a base adapted to fit into said case, means for connecting said device to said generator, and means for connecting said device to a line under test.

11. The combination with a lineman's test set including an exploring coil and a generator enclosed in a case, of an auxiliary testing device comprising an inductive balance coil adapted to cooperate with the exploring coil and a variable resistance, said balance coil and said resistance being mounted on a base attached to the inside of said case, circuit connections for connecting said device with the generator, and other circuit connections for connecting the device with a line under test.

12. A lineman's test set enclosed in a covered case and adapted to determine the direction from a given point of a fault on a metallic conductor by means of an exploring coil and a generator, and an auxiliary unit mounted in the cover of the test set case for cooperation with the test set in determining the resistance of the conductor from said point to the fault, said unit comprising a base on which are mounted an inductive balance coil adapted to be engaged by said exploring coil, a variable resistance connected to said balance coil, and terminals for temporarily connecting the unit with the test set.

13. A lineman's test set for determining the direction from a given point of a fault on a metallic conductor by means of an exploring coil and a generator, an auxiliary unit for cooperation with the test set in determining the resistance of the conductor from said point to the fault, said unit comprising a base of insulating material provided with a recessed slot holding a coil spool adapted to be engaged by the exploring coil of the test set, an inductive winding on the spool, a variable resistance mounted on the base and electrically connected with said winding, and terminals mounted on the base for temporarily connecting said winding and said resistance with the test set.

14. A lineman's test set enclosed in a case and provided with an exploring coil and line clips for effecting a connection with a line under test, and an auxiliary resistance measuring device also enclosed in said case, said device comprising an inductive balance coil adapted to be engaged by the exploring coil of the test set, a variable resistance connected to said balance coil, terminals adapted to be connected to a line under test, and terminals adapted to be engaged by the line clips of the test set to effect an operative connection therewith.

15. A testing device comprising a flat rectangular base of insulating material on which are assembled, a coil spool supporting an inductive winding and shaped to accommodate the jaws of an exploring coil, a variable resistance electrically connected with said winding, terminals for effecting a temporary connection with a tone generator, and terminals for effecting a connection with a line under test.

16. A testing device comprising a flat rectangular base of insulating material adapted to fit into the cover of a portable lineman's test set, a variable resistance mounted on said base, a coil spool assembled integrally with the base and shaped to accommodate the exploring coil of the test set, and terminals mounted on the base for effecting a temporary connection with the test set and with a line under test.

17. A testing device comprising a flat rectangular base of insulating material on which are assembled, a coil spool supporting an inductive winding, a rheostat having its movable element connected to one end of said winding, a pair of terminals connected respectively to the other end of said winding and to the resistance element of said rheostat, and a second pair of terminals connected respectively to the middle point of said winding and to the second terminal of said first pair.

18. A coil spool consisting of a single piece of insulating material with a depression in the upper side to accommodate the upper jaw of an exploring coil, a slot in the lower side to accommodate the lower jaw of the exploring coil, a continuous slot around the perimeter for supporting the coil winding, and metallic inserts extending through the insulating material for completing a magnetic circuit between the two jaws of an exploring coil engaging the spool.

In witness whereof, I hereunto subscribe my name this 29th day of October A. D. 1929.

CLARENCE A. ANDERSON.